July 1, 1924.
J. H. LACY
1,499,376
AUTOMOBILE BRAKE GUARD
Filed March 14, 1922
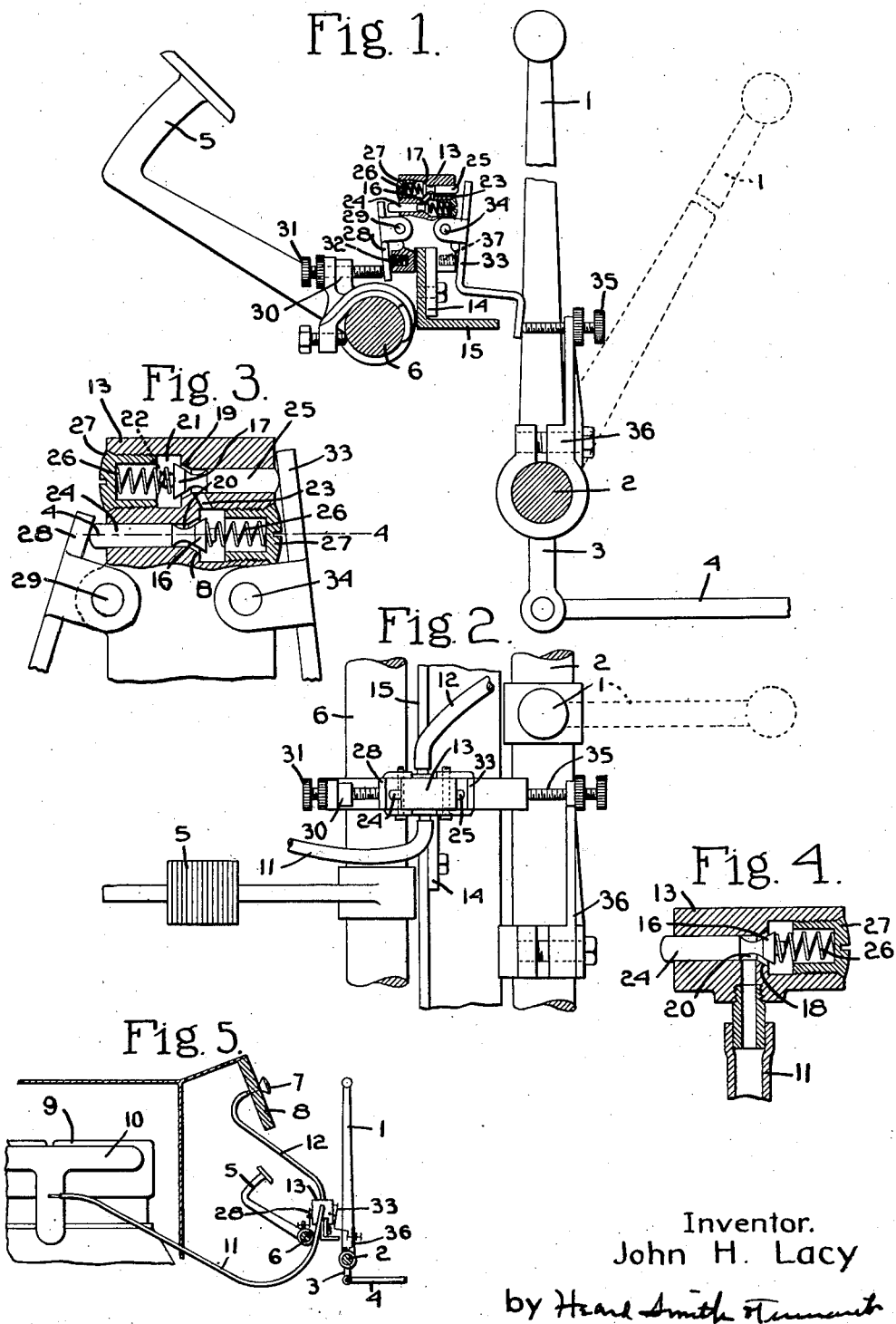
Inventor.
John H. Lacy
by Heard Smith Tennant
Attys.

Patented July 1, 1924.

1,499,376

UNITED STATES PATENT OFFICE.

JOHN HOWARD LACY, OF BOSTON, MASSACHUSETTS.

AUTOMOBILE BRAKE GUARD.

Application filed March 14, 1922. Serial No. 543,587.

*To all whom it may concern:*

Be it known that I, JOHN HOWARD LACY, a citizen of the United States, and resident of Boston, county of Suffolk, State of Massachusetts, have invented an Improvement in Automobile Brake Guards, of which the following description, in connection with the accompanying drawing, is a specification, like characters on the drawing representing like parts.

This invention relates to and has for its object the provision of means for guarding the brake of an automobile or similar machine so as to prevent the starting thereof with the brake wholly or partially applied.

It is a more or less common experience with operators of automobiles to start, or attempt to start, the automobile with the emergency brake applied. This is obviously undesirable as it results in undue strain upon the engine and upon the mechanism of the vehicle and also produces undue wear upon the brake mechanism.

The object of the invention is to provide an improved form of audible signal device which will become operative to give a warning when an attempt is made to start the automobile or other machine with the brakes partially or completely applied.

Another object of the invention is to provide an improved signal for this purpose which is actuated from the engine.

These and other objects and features of the invention will appear more fully from the accompanying description and drawing and will be particularly pointed out in the claims.

In the drawings: Fig. 1 is a side elevation of the main portions of a preferred form of apparatus embodying my invention.

Fig. 2 is a top plan view of the construction shown in Fig. 1.

Fig. 3 is a view in side elevation of a part of the construction shown in Fig. 1 and on a larger scale with the valve enclosing portion shown in central vertical cross section.

Fig. 4 is a detail in horizontal cross section showing the connection between the valve device and air pipe.

Fig. 5 is a diagrammatic view showing the main elements involved in the apparatus.

Since the invention is adaptable to a wide range of machines, such for example as automobiles, and is not concerned with any of the mechanism of the automobile or vehicle other than those parts to which it is directly connected, it is unnecessary to illustrate or describe in detail the mechanism of the machine or automobile.

In Figs. 1 and 2 a brake actuator is shown in the form of the ordinary emergency brake of an automobile comprising an up-standing arm or handle 1 connected to a horizontal rotatable shaft 2, the arm 3 connected to and extending downwardly from the shaft 2 and the brake rod 4 pivotally connected to the lower end of the arm 3 and extending to the brake mechanism.

In the form illustrated it is assumed that a movement of the arm 1 from the full to the dotted line position Fig. 1 will apply the brake mechanism while a movement in the opposite direction will release the brake mechanism, and said arm 1 is shown in full lines in Fig. 1 in the position it assumes when the brake is released. The construction shown in Figs. 1 and 2 also includes a connection actuator shown in the form of a clutch pedal 5 connected to a horizontal rotatable shaft 6. This is illustrated as of the ordinary type adapted to control the clutch which connects and disconnects the engine to the driving elements or wheels or to the rear wheels of the automobile. In the construction illustrated it is assumed that when the clutch pedal 5 is in the position shown the clutch will be active to connect the engine to the driving shaft or driving wheel and when the clutch pedal is moved toward the left the clutch will be disconnected.

It is to be understood, of course, that there may be other and additional means for effecting the connection and disconnection of the engine to the driving elements, such for instance as the usual transmission mechanism. The invention in fact is to be considered as utilizing any connection actuator which is movable to effect the connection and disconnection of the engine to the driving elements, that is, anyone of the various elements which have to be moved to effect this result such as the connection controlling lever, the clutch pedal, the transmission lever or other member.

In the particular embodiment of the invention illustrated I have provided an audible signal which is actuated by the engine but is controlled by the brake and connection actuators so that if the brake is not properly released before the automobile is started an audible signal will be produced.

For this purpose I propose to employ a signal in the form of a whistle or other device which will be pneumatically actuated and to provide means operated by the engine for actuating the signal, and also to provide a controlling means associated with the brake and connection actuators to render the signal operative or inoperative when the automobile starts, depending upon whether the brake is applied or released.

In the construction illustrated the signal is in the form of a whistle 7 which may be located in any convenient place, such for instance, as on the instrument board 8 of the automobile. While this signal may be operated in various ways without departing from the invention such for instance as by means of the exhaust from the engine, by the compression in one or more of the cylinders of the engine, or by the suction generated in the intake manifold or by compressed air, yet for illustrative purposes I have shown the signal as operated by the suction produced in the intake manifold of the engine.

In Fig. 5 the automobile engine is indicated diagrammatically at 9 and the intake manifold is shown at 10. This manifold has a pipe 11 connected thereto which leads to a controlling valve device and another pipe 12 leads from this valve device to the whistle or signal 7. This valve device is constructed so that when the emergency brake is released and the clutch is connected the valve will be closed thus rendering the signal inoperative but if the brake is still applied when the clutch is rendered operative to start the automobile the valve device will be opened thus forming communication between the signal and the intake manifold so that the suction in the manifold will operate the signal.

This valve device comprises a block or valve casing 13 which is herein shown as having an arm 14 extending therefrom that is bolted or otherwise secured to the frame member 15 of the automobile. This valve casing 13 contains two spring-pressed valves 16 and 17 which are adapted to seat against valve seats 18 and 19.

The space 20 beneath the valve seat 18 communicates through a port with the pipe 11 and the space 21 above the valve 17 communicates through a port 22 with the pipe 12. The valve casing 13 is also provided with a passage 23 leading from one valve to the other.

The valve 16 has a valve stem 24 which projects beyond the valve casing 13 and the valve 17 is provided with a valve stem 25 also projecting beyond said valve casing but on the opposite side. The two valves are normally retained on their seats by springs 26 which are herein shown as confined within spring housings 27 that are screwed into the valve casing.

Co-operating with the valve stem 24 of the valve 16 is a spring-pressed lever 28 pivoted at 29 to the valve casing 13 and adapted to be actuated from a bracket 30 which is fast on the clutch shaft 6. This bracket is shown as carrying a stop screw 31 which is adjustable therein and which is arranged to engage the lever 28 and hold it in the position shown in Fig. 1 when the clutch is engaged. This lever is acted upon by a spring 32 which tends to move the lever into the position shown in Fig. 3 when the clutch pedal 5 is depressed to disengage the clutch. The spring 32 is strong enough to overcome the spring 26 which normally holds the valve 16 to its seat and, therefore, when the clutch pedal is depressed the valve 16 will be lifted from its seat by the movement of the lever 28. So long as the clutch pedal is in its rearward position shown in Fig. 1, however, the valve 16 will be held to its seat by its spring 26.

The valve housing 13 has another lever 33 pivoted thereto at 34, which lever is adapted to engage the projecting end of the valve stem 25. This lever is acted on by a spring 37 which tends to swing it into the position shown in Fig. 3, said spring being strong enough to lift the valve from its seat against the action of the spring 26. The lower end of this lever 33 is offset slightly and is arranged to be engaged by a stop screw 35 adjustably carried on the end of a bracket arm 36 which in turn is fast on the brake shaft 2. The bracket arm 36 is so constructed and adjusted that when the brake arm 1 is in its rearward position shown in dotted lines Fig. 1, in which position the brakes are set, the stop screw 35 will be separated from the lever 33. The spring 37, which is stronger than the spring acting on the valve 17, will under these conditions swing the lever 33 into the position shown in Fig. 3, thus opening the valve 17. When the brake arm 1 is moved forwardly into the full line position shown in Fig. 1, in order to release the brakes then the stop screw 35 will engage the lower end of the lever 33 and swing the latter thereby separating the upper end of the lever from the valve stem 25 and allowing the valve 17 to be seated. The valve 17 is, therefore, seated so long as the brakes are released but is opened when the brakes are applied. The valve 16 on the other hand is seated when the connection actuator is positioned to connect the clutch but is unseated when the connection actuator is moved to disconnect the clutch.

The operation of the apparatus will be apparent from the foregoing. When the brake mechanism is applied the valve 17 is opened as shown in Fig. 3, and so long as the connection actuator is in the position shown in Fig. 1 the valve 16 will be seated thus closing communication between the engine manifold and the signal. When, therefore, the automobile engine is started the suction produced in the manifold will not operate the signal because the valve 16 is closed and shuts off communication between the intake manifold and the signal.

The starting of the automobile in motion involves the manipulation of the connection actuator 5. If this connection actuator is a clutch pedal then the latter will be depressed to permit the operator to shift the transmission gears and if this is done without releasing the emergency brake the depressing of the pedal 5 will result in opening the valve 16, thus establishing a communication between the intake manifold and the signal 7. The suction in the intake manifold will sound the signal thus warning the driver that the brake is still applied. As soon as the brake is released by moving the brake arm forwardly the lever 33 will be shifted into the position shown in Fig. 3 thereby allowing the valve 17 to close. As soon as this occurs the signal will stop sounding because communication between the latter and the intake pipe is closed through the valve 17.

I claim:

1. In an automobile, a brake actuator movable to apply and release brake mechanism, a connection actuator movable to effect the connection and disconnection of the engine to the driving elements, a pneumatically actuated normally inactive signal, and means controlled by the absence of the brake actuator from releasing position to render the signal operative upon movement of the clutch actuator.

2. In an automobile, a brake actuator movable to apply and release brake mechanism, a clutch movable to effect the connection and disconnection of the engine to the driving elements, a clutch actuator, a signal adapted to be operated by the engine, and means controlled by the absence of the brake actuator from releasing position to render the signal operative by the engine upon movement of the clutch actuator.

3. In an automobile, a brake actuator movable to apply and release brake mechanism, a connection actuator movable to effect the connection and disconnection of the engine to the driving elements, a pneumatically actuated signal, means connecting said signal to the intake manifold of the engine, said means including valve devices controlled by the absence of the brake actuator from releasing position to render the signal operative upon movement of the connection actuator.

4. In an automobile, a brake actuator movable to apply and release brake mechanism, a connection actuator movable to effect the connection and disconnection of the engine to the driving elements, a suction-operated signal, a pipe connection between the signal and the intake manifold of the engine, a valve device in said connection, and means operative when the brake actuator is absent from releasing position but inoperative when the brake actuator is in releasing position to open the valve device upon actuation of the connection actuator, whereby the signal is actuated if an attempt is made to start the automobile while the brake is wholly or partially applied.

5. In an automobile, a brake actuator movable to apply and release brake mechanism, a connection actuator movable to effect the connection and disconnection of the engine to the driving elements, a suction operated signal, a pipe connection between said signal and the intake manifold of the engine, two valves in series in said connection, means for opening one valve when the brake actuator is absent from releasing position, and the other valve when the connection actuator is operated, whereby the signal is actuated if an attempt is made to start the automobile with the brake wholly or partially applied.

6. In an automobile, a brake actuator movable to apply and release brake mechanism, a connection actuator movable to effect the connection and disconnection of the engine to the driving elements, a suction operated signal, a pipe connection between the signal and the intake manifold of the engine, two valves in said pipe connection arranged in series, a spring normally holding each valve closed, means controlled by the brake actuator and operative to open one valve when the brake mechanism is applied, and means controlled by the connection actuator to open the other valve upon operation of said actuator, whereby a signal is given if an attempt is made to start the automobile with the brake mechanism applied.

7. In an automobile a brake actuator movable to apply and release brake mechanism, a pneumatically actuated normally inactive signal, a pipe connected to the signal, means for inducing a flow of air in the pipe sufficient to actuate the signal, means acting when the brake actuator is in releasing position to cut off, and when the brake actuator is absent from releasing position to permit, the signal actuating flow of air in the pipe, and a second means independent of the position of the brake actuator for cutting off and permitting said flow.

8. In an automobile a brake actuator movable to apply and release brake mechanism, a pneumatically actuated normally inactive signal, a pipe connected to the signal, means operated by the engine for inducing a flow of air in the pipe sufficient to actuate the signal, means acting when the brake actuator is in releasing position to cut off, and when the brake actuator is absent from releasing position to permit, the signal actuating flow of air in the pipe, and a second means independent of the position of the brake actuator for cutting off and permitting said flow.

In testimony whereof, I have signed my name to this specification.

JOHN HOWARD LACY.